United States Patent
Elshafie et al.

(10) Patent No.: US 12,439,410 B2
(45) Date of Patent: Oct. 7, 2025

(54) TRANSMITTING AN INDICATION OF A WAVEFORM USED BY A NETWORK NODE

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/929,220

(22) Filed: Sep. 1, 2022

(65) Prior Publication Data
US 2024/0080842 A1    Mar. 7, 2024

(51) Int. Cl.
*H04W 72/04* (2023.01)
*H04W 72/20* (2023.01)
*H04W 92/18* (2009.01)

(52) U.S. Cl.
CPC ............ *H04W 72/20* (2023.01); *H04W 92/18* (2013.01)

(58) Field of Classification Search
CPC ..... H04W 72/20; H04W 72/25; H04W 88/04; H04L 5/0044; H04L 5/0091; H04L 5/0007; H04L 5/0048; H04L 5/0051; H04L 5/0053; H04L 5/0005; H04L 27/2636; H04L 27/26136; H04L 27/34
See application file for complete search history.

(56) References Cited

U.S. PATENT DOCUMENTS

2021/0410111 A1* 12/2021 Yokomakura ......... H04W 72/02
2022/0141804 A1*  5/2022 Bayesteh ................ H04W 8/24
                                                            370/329

\* cited by examiner

*Primary Examiner* — Jamal Javaid
(74) *Attorney, Agent, or Firm* — Harrity & Harrity, LLP

(57) ABSTRACT

Various aspects of the present disclosure generally relate to wireless communication. In some aspects, a first user equipment (UE) may obtain an indication of a waveform associated with a network node, the indication indicating whether the waveform is used by the network node in a Uu link associated with the network node. The first UE may transmit, to a second UE and via a sidelink interface between the first UE and the second UE, the indication of the waveform associated with the network node. Numerous other aspects are described.

28 Claims, 14 Drawing Sheets

TRANSMITTING AN INDICATION OF A WAVEFORM USED BY A NETWORK NODE

FIELD OF THE DISCLOSURE

Aspects of the present disclosure generally relate to wireless communication and to techniques and apparatuses for transmitting an indication of a waveform used by a network node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: obtain an indication of a waveform associated with a network node, the indication indicating whether the waveform is used by the network node in a Uu link associated with the network node; and transmit, to a second UE and via a sidelink interface between the first UE and the second UE, the indication of the waveform associated with the network node.

In some implementations, an apparatus for wireless communication at a second UE includes a memory and one or more processors, coupled to the memory, configured to: receive, from a first UE and via a sidelink interface between the second UE and the first UE, an indication of a waveform associated with a network node, wherein the indication indicates whether the waveform is used by the network node in a Uu link associated with the network node; and perform, to the network node, a transmission based at least in part on the waveform associated with the network node.

In some implementations, a method of wireless communication performed by an apparatus of a first UE includes obtaining an indication of a waveform associated with a network node, the indication indicating whether the waveform is used by the network node in a Uu link associated with the network node; and transmitting, to a second UE and via a sidelink interface between the first UE and the second UE, the indication of the waveform associated with the network node.

In some implementations, a method of wireless communication performed by an apparatus of a second UE includes receiving, from a first UE and via a sidelink interface between the second UE and the first UE, an indication of a waveform associated with a network node, wherein the indication indicates whether the waveform is used by the network node in a Uu link associated with the network node; and performing, to the network node, a transmission based at least in part on the waveform associated with the network node.

In some implementations, a non-transitory computer-readable medium storing a set of instructions for wireless communication includes one or more instructions that, when executed by one or more processors of a first UE, cause the first UE to: obtain an indication of a waveform associated with a network node, the indication indicating whether the waveform is used by the network node in a Uu link associated with the network node; and transmit, to a second UE and via a sidelink interface between the first UE and the second UE, the indication of the waveform associated with the network node.

In some implementations, a non-transitory computer-readable medium storing a set of instructions for wireless communication includes one or more instructions that, when executed by one or more processors of a second UE, cause the second UE to: receive, from a first UE and via a sidelink interface between the second UE and the first UE, an indication of a waveform associated with a network node, wherein the indication indicates whether the waveform is used by the network node in a Uu link associated with the network node; and perform, to the network node, a transmission based at least in part on the waveform associated with the network node.

In some implementations, a first apparatus for wireless communication includes means for obtaining an indication of a waveform associated with a network node, the indication indicating whether the waveform is used by the network node in a Uu link associated with the network node; and transmitting, to a second UE and via a sidelink interface between the first UE and the second UE, the indication of the waveform associated with the network node.

In some implementations, a second apparatus for wireless communication includes means for receiving, from a first apparatus and via a sidelink interface between the second apparatus and the first apparatus, an indication of a waveform associated with a network node, wherein the indication indicates whether the waveform is used by the network node in a Uu link associated with the network node; and means for performing, to the network node, a transmission based at least in part on the waveform associated with the network node.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
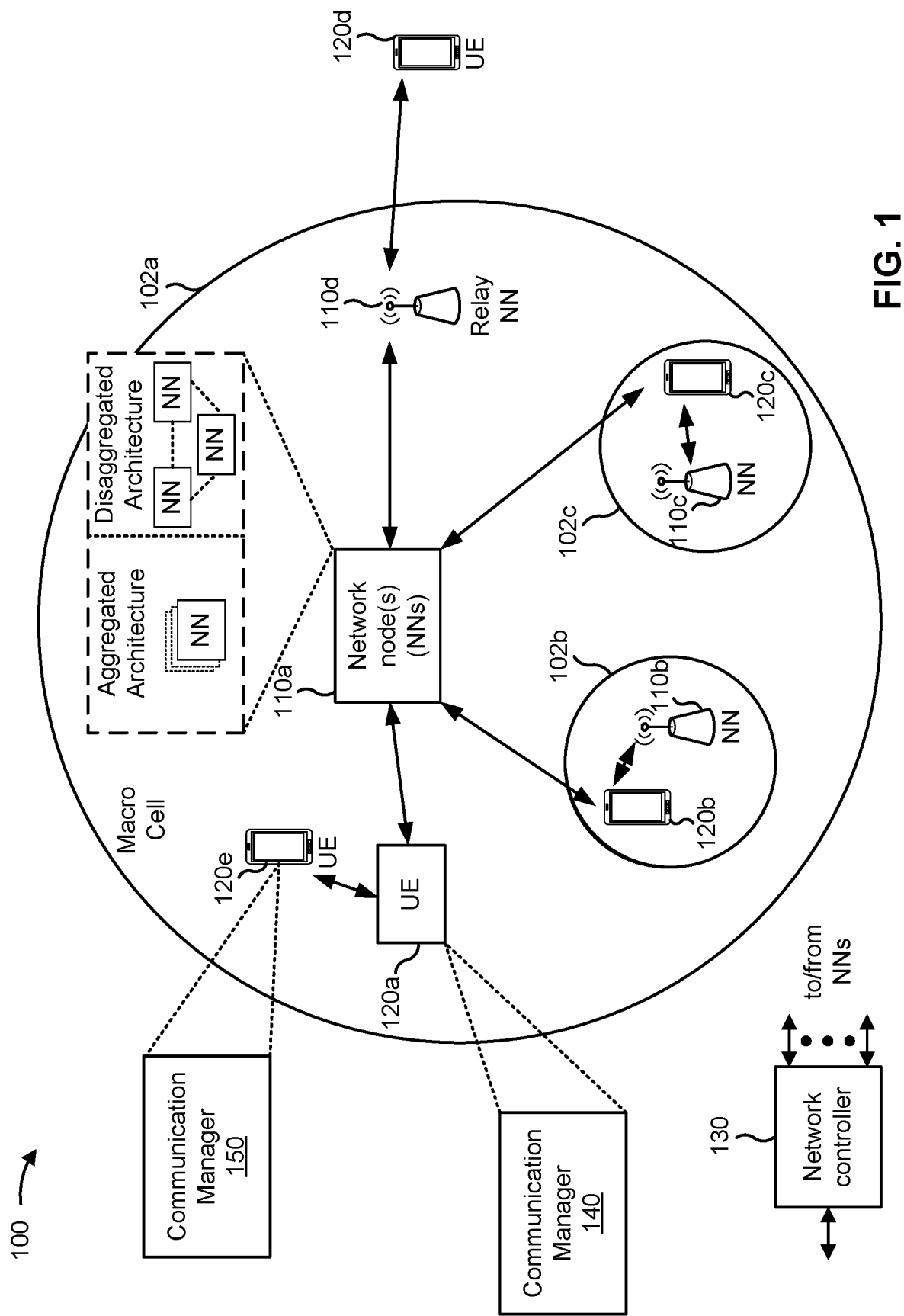
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120*a*) may include a communication manager 140. As described in more detail elsewhere herein, the communication manager 140 may obtain an indication of a waveform associated with a network node, the indication indicating whether the waveform is used by the network node in a Uu link associated with the network node; and transmit, to a second UE and via a sidelink interface between the first UE and the second UE, the indication of the waveform associated with the network node. Additionally, or alternatively, the communication manager 140 may perform one or more other operations described herein.

In some aspects, a second UE (e.g., UE 120*e*) may include a communication manager 150. As described in more detail elsewhere herein, the communication manager 150 may receive, from a first UE and via a sidelink interface between the second UE and the first UE, an indication of a waveform associated with a network node, wherein the indication indicates whether the waveform is used by the network node in a Uu link associated with the network node; and perform, to the network node, a transmission based at least in part on the waveform associated with the network node. Additionally, or alternatively, the communication manager 150 may perform one or more other operations described herein.

As indicated above, FIG. 1 is provided as an example. Other examples may differ from what is described with regard to FIG. 1.

Figure 2:
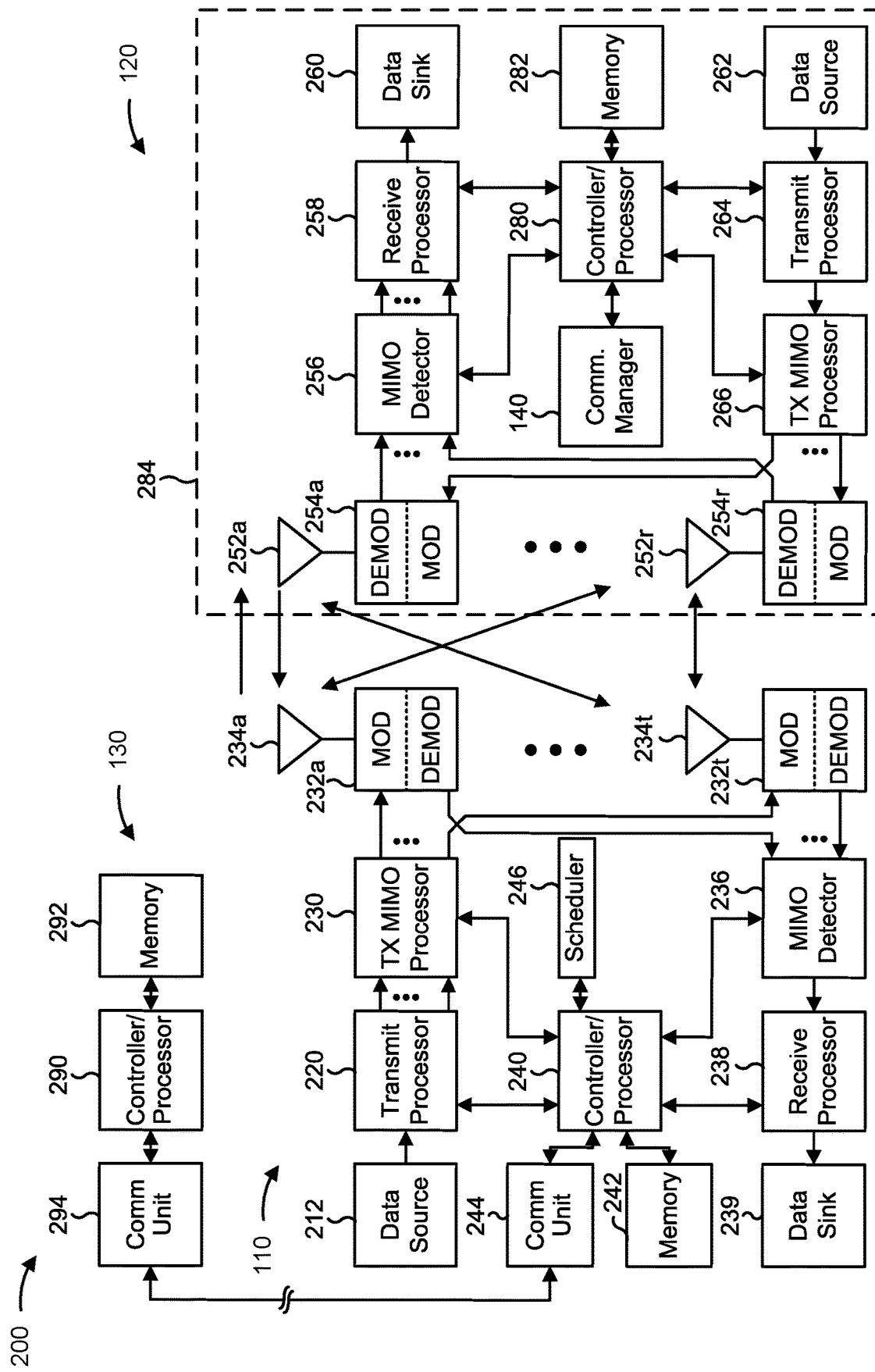
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a Tx MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the Tx MIMO processor 266. The transceiver may be used by a processor (e.g., the controller/processor 280) and the memory 282 to perform aspects of any of the methods described herein (e.g., with reference to FIGS. 10-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the Tx MIMO processor 230. The transceiver may be used by a processor (e.g., the controller/processor 240) and the memory 242 to perform aspects of any of the methods described herein (e.g., with reference to FIGS. 10-14).

The controller/processor 240 of the network node 110, the controller/processor 280 of the UE 120, and/or any other component(s) of FIG. 2 may perform one or more techniques associated with transmitting an indication of a waveform used by a network node, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for obtaining an indication of a waveform associated with a network node, the indication indicating whether the waveform is used by the network node in a Uu link associated with the network node; and/or means for transmitting, to a second UE and via a sidelink interface between the first UE and the second UE, the indication of the waveform associated with the network node. In some aspects, the means for the apparatus to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for receiving, from a first UE and via a sidelink interface between the second UE and the first UE, an indication of a waveform associated with a network node, wherein the indication indicates whether the waveform is used by the network node in a Uu link associated with the network node; and/or means for performing, to the network node, a transmission based at least in part on the waveform associated with the network node. In some aspects, the means for the apparatus to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the Tx MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
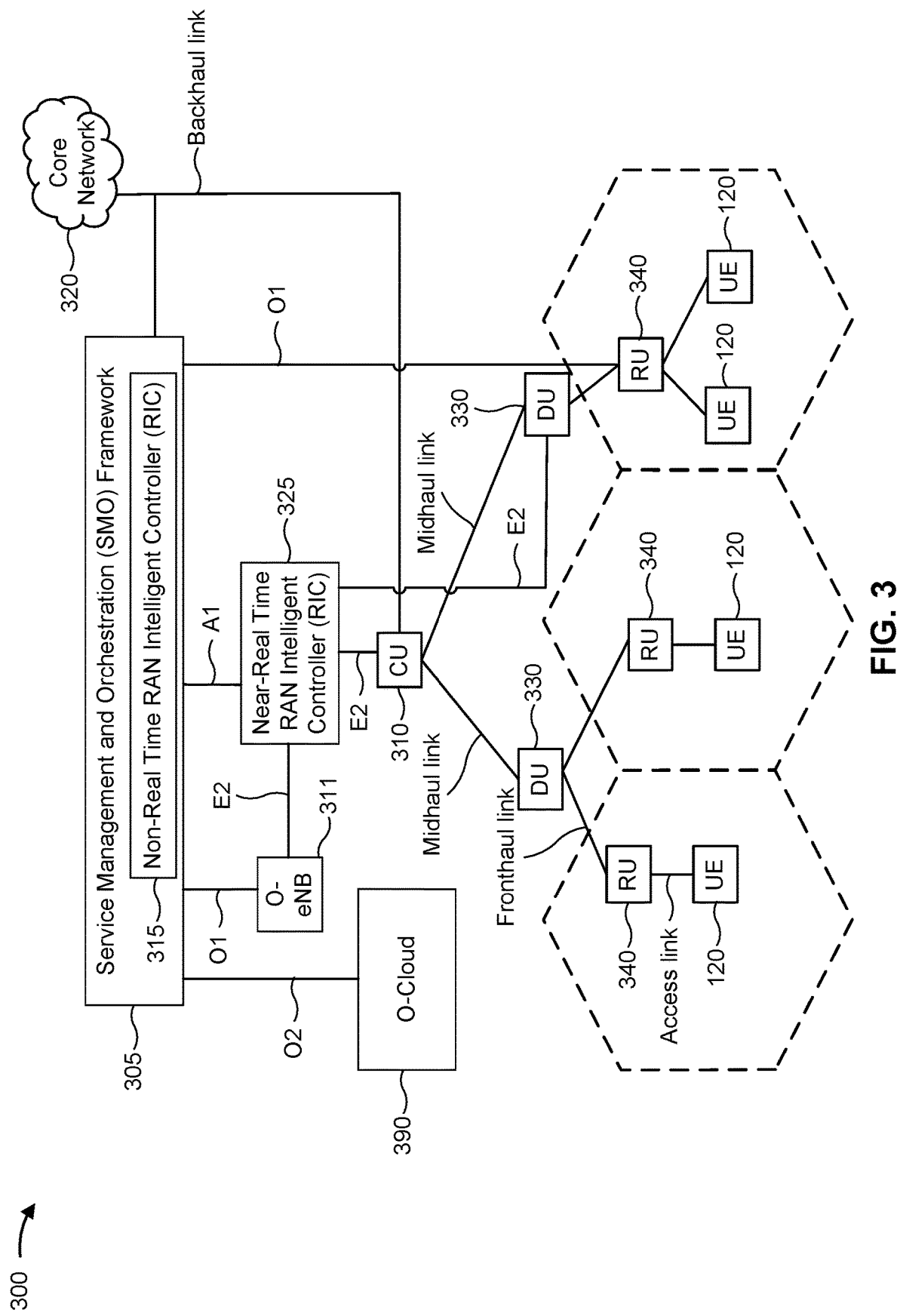
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Network power saving may take different modes and operations to save power and maintain network operations. A network node in a cellular network may switch between power modes according to a network input and current traffic conditions. For example, in low traffic conditions, the network node may not activate all antennas of the network node. Different power modes may involve adapting bandwidths and/or a quantity of active antennas to save power. Network energy consumption may be a high cost when running the cellular network, and much of the network energy consumption is due to the RAN. Network energy savings may be critical for adoption and expansion of cellular networks.

A network node energy consumption model may serve to improve network energy savings at the network node side. The network node energy consumption model may include a relative energy consumption for a downlink and an uplink, which may consider various factors such as power amplifier efficiency, a quantity of transceiver units (TxRUs), and/or a network node load. The network node energy consumption model may include sleep states and associated transition times, and one or more reference parameters and/or configurations. The network node energy consumption model may be assessed in terms of network and user performance based at least in part on various key performance indicators (KPIs), such as spectral efficiency, capacity, user perceived throughput (UPT), latency, handover performance, call drop rate, initial access performance, energy efficiency, UE power consumption, and/or complexity. The network node energy consumption model may aim to improve network energy savings for network node transmissions and receptions. The network node energy consumption model may aim to dynamically and/or semi-statically achieve more efficient operations for transmissions and/or receptions, where network energy savings may be in time, frequency, spatial, and/or power domains. The network node energy consumption model may be based at least in part on support/feedback from the UE, UE assistance information, and/or information exchange/coordination over network interfaces.

Figure 4:
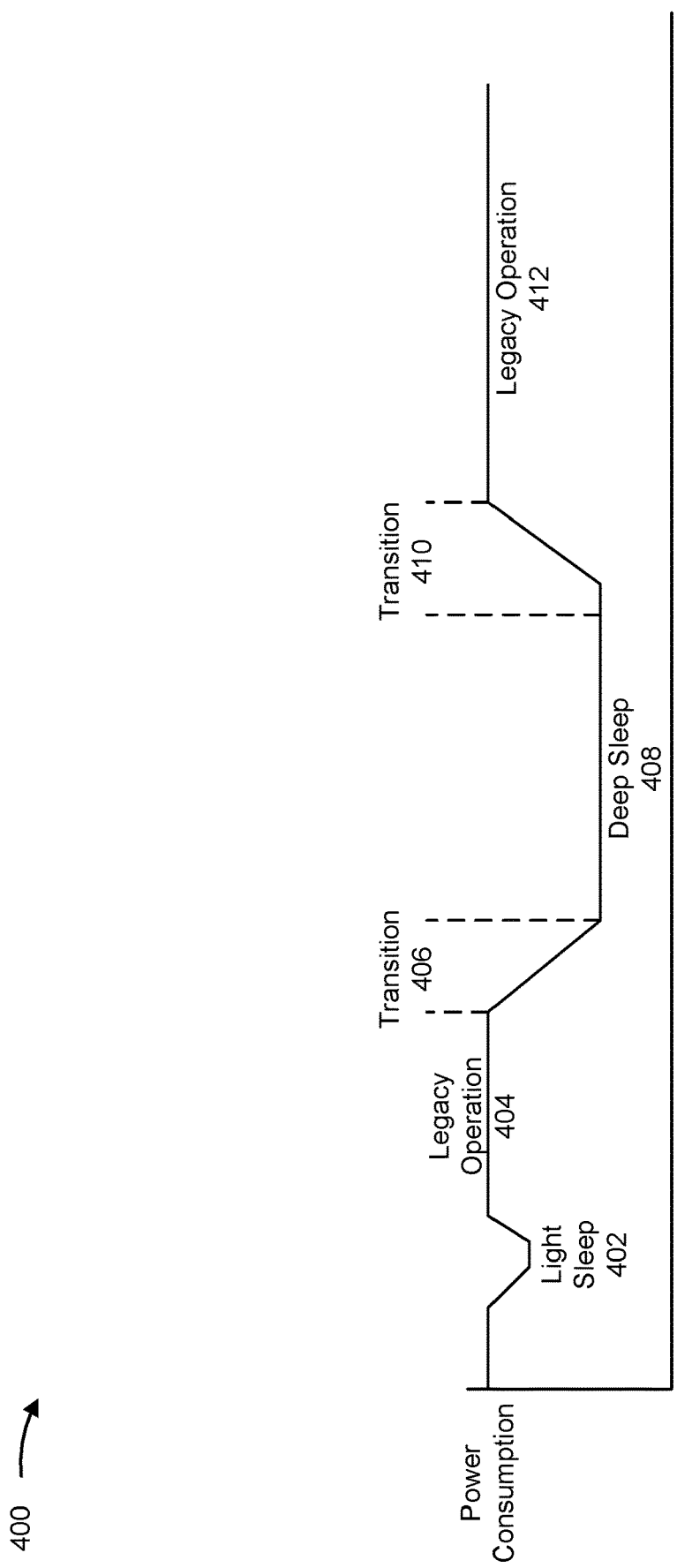
FIG. 4 is a diagram illustrating an example of network sleep modes, in accordance with the present disclosure.

FIG. 4 is a diagram illustrating an example 400 of network sleep modes, in accordance with the present disclosure.

A network node may enter different sleep modes based at least in part on traffic. The sleep modes may be different in terms of operation. For example, some sleep modes (e.g., deep sleep mode) may turn off RF chains while other sleep modes (e.g., light sleep mode) may not turn off RF chains. The different sleep modes may have different power consumption levels and require different transition times.

As shown in FIG. 4, a network node may operate according to a legacy operation. The legacy operation may be associated with a power consumption level. As shown by reference number 402, the network node may enter a light sleep mode, which may reduce the power consumption level in relation to the legacy operation. As shown by reference number 404, the network node may return back to the legacy operation after the light sleep mode. As shown by reference number 406, the network node may enter a transition state. As shown by reference number 408, the network node may enter a deep sleep mode from the legacy operation and after the transition state. The deep sleep mode may be associated with a lower power consumption level in relation to the light sleep mode. As shown by reference number 410, the network node may exit the deep sleep mode and enter the transition state. As shown by reference number 412, the network node may return back to the legacy operation after the deep sleep mode and after the transition state. The network node may enter the deep sleep mode and exit the deep sleep mode according to transition periods.

As indicated above, FIG. 4 is provided as an example. Other examples may differ from what is described with regard to FIG. 4.

Figure 5:
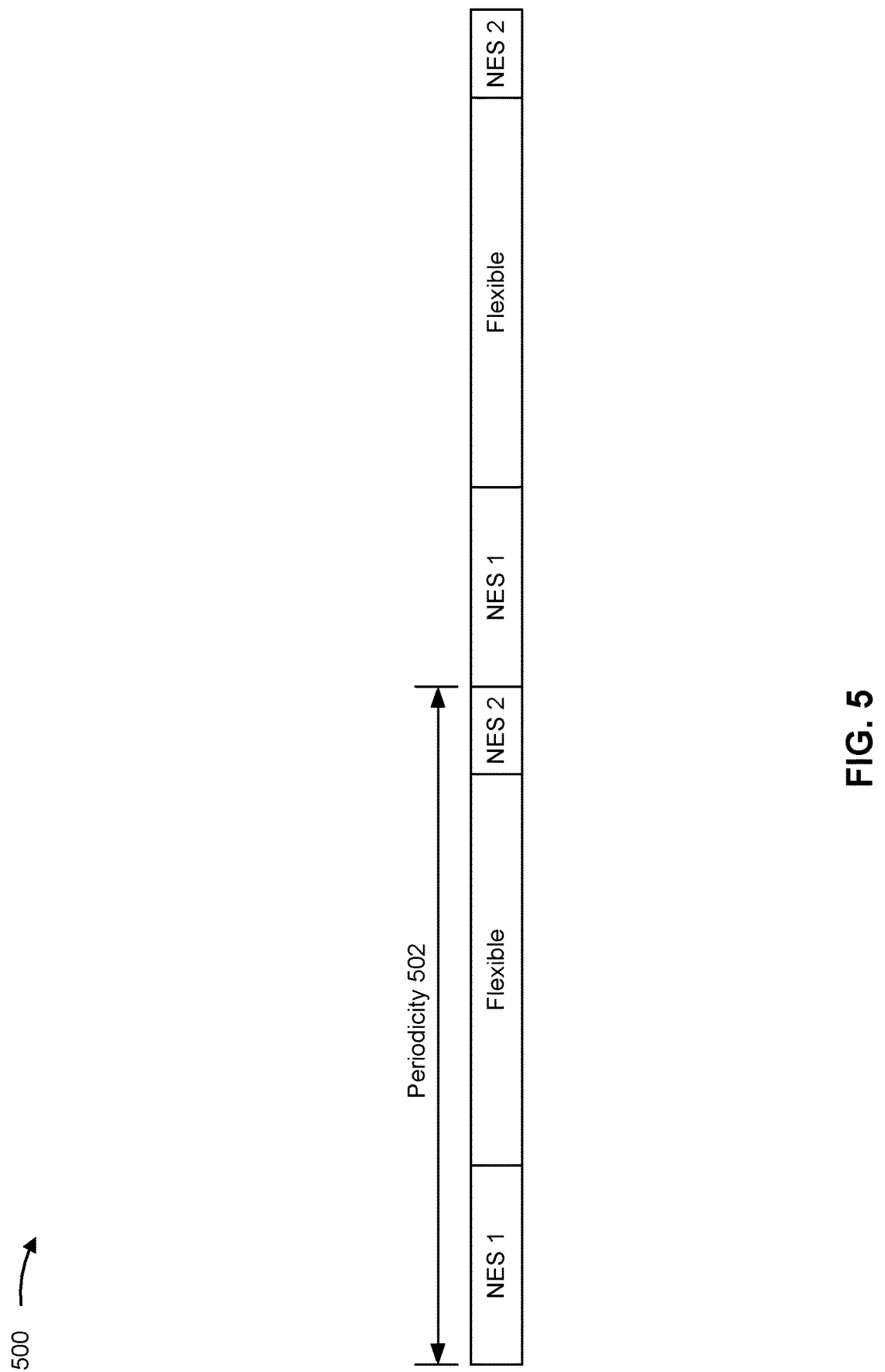
FIG. 5 is a diagram illustrating an example of network energy saving modes, in accordance with the present disclosure.

FIG. 5 is a diagram illustrating an example 500 of network energy saving modes, in accordance with the present disclosure.

A network node may semi-statically switch between different network energy saving modes in accordance with a periodicity. A network energy saving mode may refer to a specific operation by the network node that saves energy. One type of network energy saving mode may be a flexible mode, which may be a mode that stays flexible and is dynamically indicated by the network node depending on current traffic conditions. One type of network energy saving mode may be a legacy mode, which may correspond to a normal network operation.

As shown in FIG. 5, during a periodicity 502, a network node may enter a first network energy saving mode (NES1) for a first period of time, the network node may enter a flexible mode for a second period of time, and the network energy may enter a second network energy saving mode (NES2) for a second period of time. The first network energy saving mode and the second network energy saving mode may be different network energy saving modes.

As indicated above, FIG. 5 is provided as an example. Other examples may differ from what is described with regard to FIG. 5.

A 5G NR waveform may include a CP-OFDM waveform. A CP-OFDM waveform may be associated with both a downlink and an uplink. The CP-OFDM waveform may be associated with a high signal-to-noise ratio (SNR), a high spectral efficiency, and/or a high order MIMO. The CP-OFDM waveform may be suitable to achieve high data rates. The CP-OFDM waveform may be supported for higher bands (e.g., FR4 and beyond). The CP-OFDM waveform may be backwards compatible with FR1/FR2/FR2x waveforms. The CP-OFDM waveform may offer high spectral efficiency in scenarios where an energy efficient requirement is more relaxed.

A 5G NR waveform may include a single-carrier waveform, such as a DFT-s-OFDM waveform. The single-carrier waveform may be associated with a low peak-to-average-power-ratio (PAPR) and/or a single layer (for MR). The single-carrier waveform may be suitable for power-efficient transmissions, such as for coverage/Tx power limited scenarios. The single-carrier waveform may be supported for other scenarios requiring high energy efficiency. A lower PAPR may translate to a higher power amplifier efficiency. A high data rate may be achieved due to massive spectrum availability. A cyclic prefix (CP) may be added to create OFDM-like blocks or symbols to facilitate a frequency domain equalization. A guard interval, which may be a known sequence, may be considered to be a special case of cyclic prefix in this context.

A DFT-s-OFDM waveform may be based at least in part on a frequency-domain implementation. The DFT-s-OFDM waveform may be based at least in part on a frequency-domain transform precoding at a transmitter and a frequency-domain equalization at a receiver, which may be associated with a relatively high complexity. The DFT-s-OFDM waveform may be associated with a more efficient bandwidth utilization as compared to a single carrier quadrature amplitude modulation (SC-QAM) waveform. The DFT-s-OFDM waveform may be associated with a flexible bandwidth allocation, which may enable a relatively large bandwidth to be supported. The SC-QAM waveform may be based at least in part on a time-domain implementation. The SC-QAM waveform may be based at least in part on a time-domain filtering (e.g., pulse shaping filters at the transmitter, and matched filtering/time-domain equalization at the receiver), which may be associated with a relatively low complexity. The SC-QAM waveform may be associated with a bandwidth growth by time-domain filtering, which may require a guard band. The SC-QAM waveform may be associated with a restricted bandwidth allocation, such that a complexity may grow to support a diverse bandwidth allocation.

Figure 6:
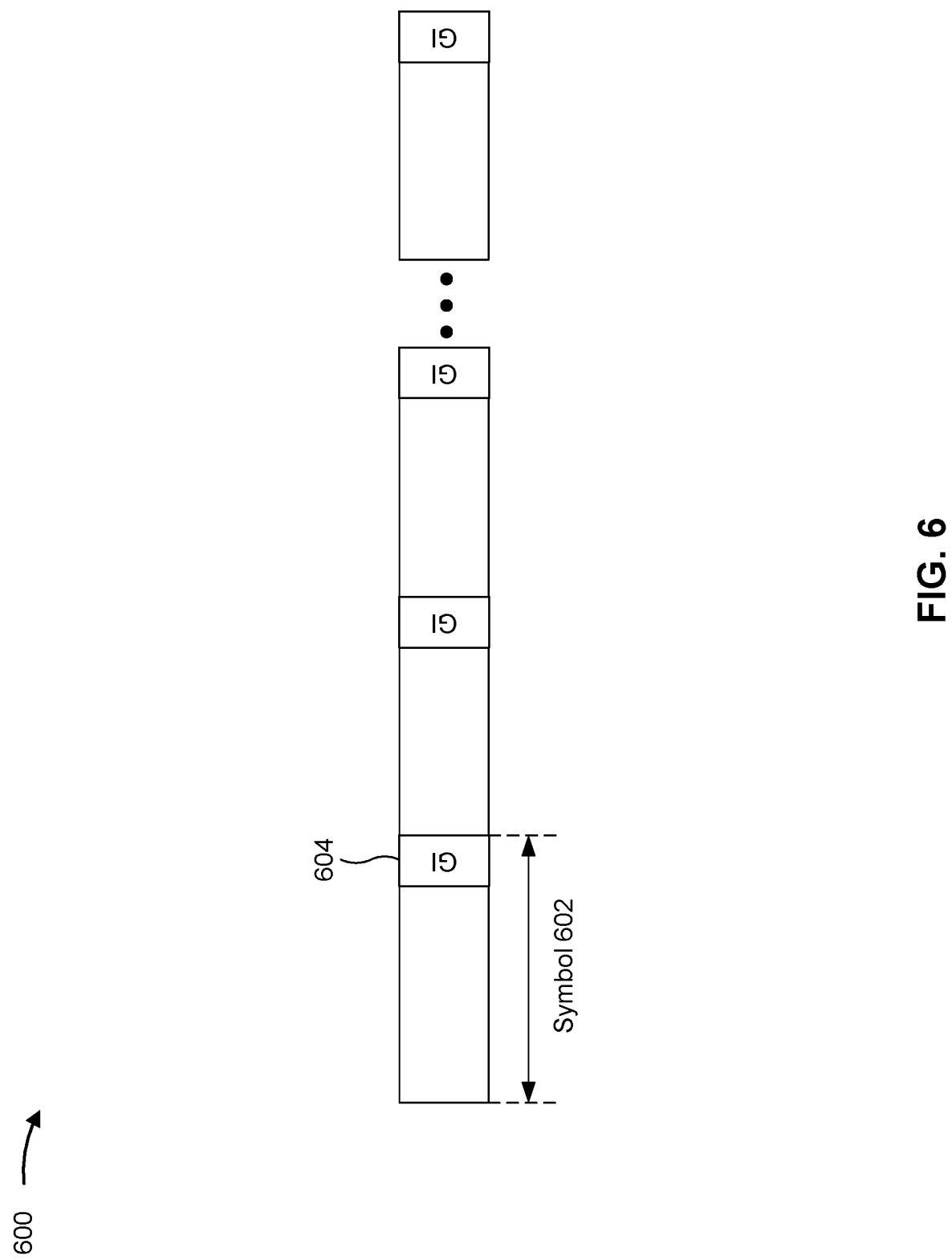
FIG. 6 is a diagram illustrating an example of a single-carrier waveform, in accordance with the present disclosure.

FIG. 6 is a diagram illustrating an example 600 of a single-carrier waveform, in accordance with the present disclosure.

As shown in FIG. 6, a transmitter may transmit a symbol 602 based at least in part on a single-carrier waveform, such as an SC-QAM waveform. The transmitter may transmit the symbol 602 based at least in part on a time-domain filtering, which may involve pulse shaping filters at the transmitter and matched filtering/time-domain equalization at a receiver that receives the symbol 602. The symbol 602 may include a guard band 604 (or guard interval), which may separate the symbol 602 from a following symbol.

As indicated above, FIG. 6 is provided as an example. Other examples may differ from what is described with regard to FIG. 6.

Figure 7:
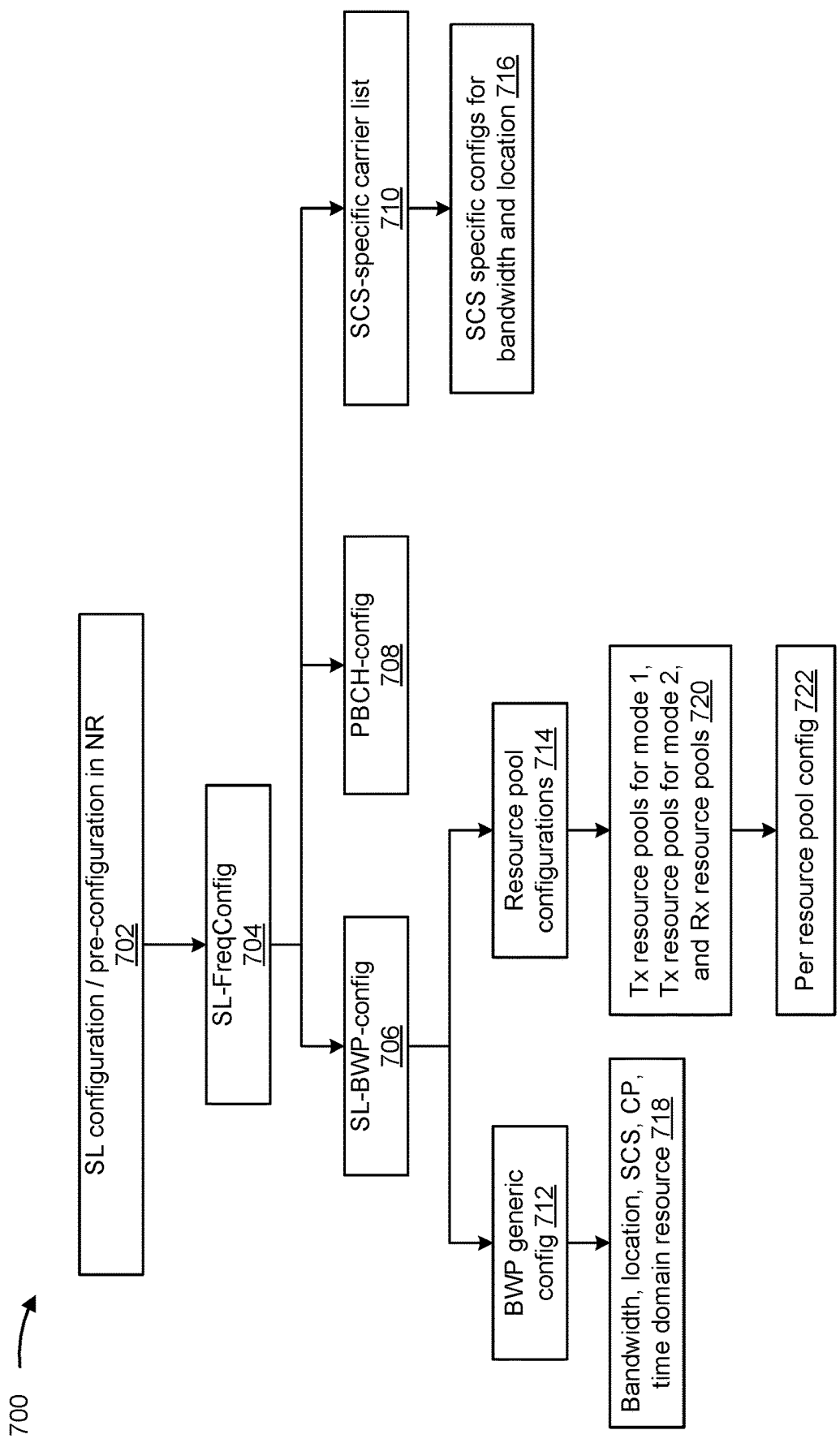
FIG. 7 is a diagram illustrating an example of a sidelink configuration, in accordance with the present disclosure.

FIG. 7 is a diagram illustrating an example 700 of a sidelink configuration, in accordance with the present disclosure.

As shown in FIG. 7, a sidelink configuration (or pre-configuration) in NR 702 may indicate a sidelink frequency configuration (SL-FreqConfig) 704. The SL-FreqConfig 704 may indicate a sidelink bandwidth part (BWP) configuration (SL-BWP-config) 706, a physical broadcast channel (PBCH) configuration 708, and a subcarrier spacing (SCS) specific carrier list (scs-specificcarrier-list) 710. The SL BWP configuration 710 may indicate a BWP generic configuration 712 and resource pool configurations 714 (e.g., sidelink resource pool configurations). The BWP generic configuration 712 may indicate a bandwidth and location in frequency, an SCS and CP, and/or a time domain resource (as shown by reference number 714). The resource pool configurations 714 may indicate Tx resource pools for a first mode (Mode 1), Tx resource pools for a second mode (Mode 2), and receive (Rx) resource pools (as shown by reference number 720). A maximum of 16 Rx pools and 8 Tx pools may be configured in a sidelink BWP. An individual resource pool configuration (e.g., for one of the Tx resource pools or the Rx resource pool), or a per resource pool configuration 722, may indicate a physical sidelink shared channel (PSSCH) configuration, a physical sidelink control channel (PSCCH) configuration, a physical sidelink feedback channel (PSFCH) configuration, a quantity of subchannels, a subchannel size, a starting resource block (RB), a channel busy ratio (CBR), an MCS, a sensing configuration, and/or a power control. The SCS specific carrier list 710 may indicate SCS specific configurations 716 for bandwidths and/or locations in frequency. In an NR sidelink design, one BWP may contain multiple Rx and Tx resource pools, and PHY layer channels may be configured per resource pool.

As indicated above, FIG. 7 is provided as an example. Other examples may differ from what is described with regard to FIG. 7.

NR sidelink transmissions may be associated with the first mode of resource allocation or the second mode of resource allocation. In the first mode, sidelink resources may be scheduled by a network node. The network node may assign resources for sidelink transmission. A dynamic allocation of resources via downlink control information (DCI) format 3-x may be supported, and/or configured transmissions (e.g., both Type-1 and Type-2) may be supported. In the second mode, a UE may autonomously select sidelink resources from a (pre-)configured sidelink resource pool(s) based at least in part on channel sensing. During a channel sensing, a UE may sense resources, and based at least in part on an outcome of the channel sensing (e.g., a priority of different transmissions and RSRP), the UE may select some resources for its sidelink transmission. When the UE is in-coverage, the network node may be configured to adopt the first mode or the second mode. When the UE is out-of-coverage, only the second mode may be adopted.

A sidelink resource pool configuration may specify configuration information for an NR sidelink communication resource pool. The sidelink resource pool configuration may include a plurality of configurations and/or parameters, such as a PSCCH configuration, a PSSCH configuration, a PSFCH configuration, a subchannel size, a quantity of subchannels, an RSSI threshold, time window sizes, a phase tracking reference signal (PTRS) configuration, and/or power control.

Figure 8:
FIG. 8 is a diagram illustrating an example of a sidelink synchronization signal block (S-SSB) structure, in accordance with the present disclosure.

FIG. 8 is a diagram illustrating an example 800 of a sidelink synchronization signal block (S-SSB) structure, in accordance with the present disclosure.

As shown in FIG. 8, an S-SSB structure may be associated with an S-SSB bandwidth, which may be associated with 11 physical resource blocks (PRBs). The S-SSB bandwidth may include a physical sidelink broadcast channel (PSBCH), which may be 11 PRBs and 9/7 OFDM symbols for a normal cyclic prefix (NCP) or extended cyclic prefix (ECP), where a first PSBCH symbol 802 may be used for automatic gain control (AGC) training at a receiver. The S-SSB bandwidth may include a sidelink primary synchronization signal (S-PSS) 804, which may be associated with a length 127 M-sequence and a same generator/initial value as a Uu PSS with cyclic shifts (CSs) {22, 65}, and which may be repeated on two consecutive symbols. The S-SSB bandwidth may include a sidelink secondary synchronization signal (S-SSS) 806, which may be associated with a length 127 Gold sequence and a same generator/initial value and CSs as a Uu SSS, and which may be repeated on two consecutive symbols. The S-SSB bandwidth may include a DMRS, which may be in every PSBCH symbol on every fourth resource element (RE). A last symbol may be a gap symbol 808.

A PSBCH may be associated with a 56-bit payload, which may include a direct frame number (DFN) (10 bits), an indication of a time division duplexing (TDD) configuration (12 bits), a slot index (7 bits), an in-coverage indicator (one bit), reserve bits (2 bits), and a cyclic redundancy check (CRC) (24 bits). The indication of the TDD configuration may be associated with system-wide information, such as a TDD uplink-downlink common configuration and/or potential sidelink slots.

As indicated above, FIG. 8 is provided as an example. Other examples may differ from what is described with regard to FIG. 8.

Figure 9:
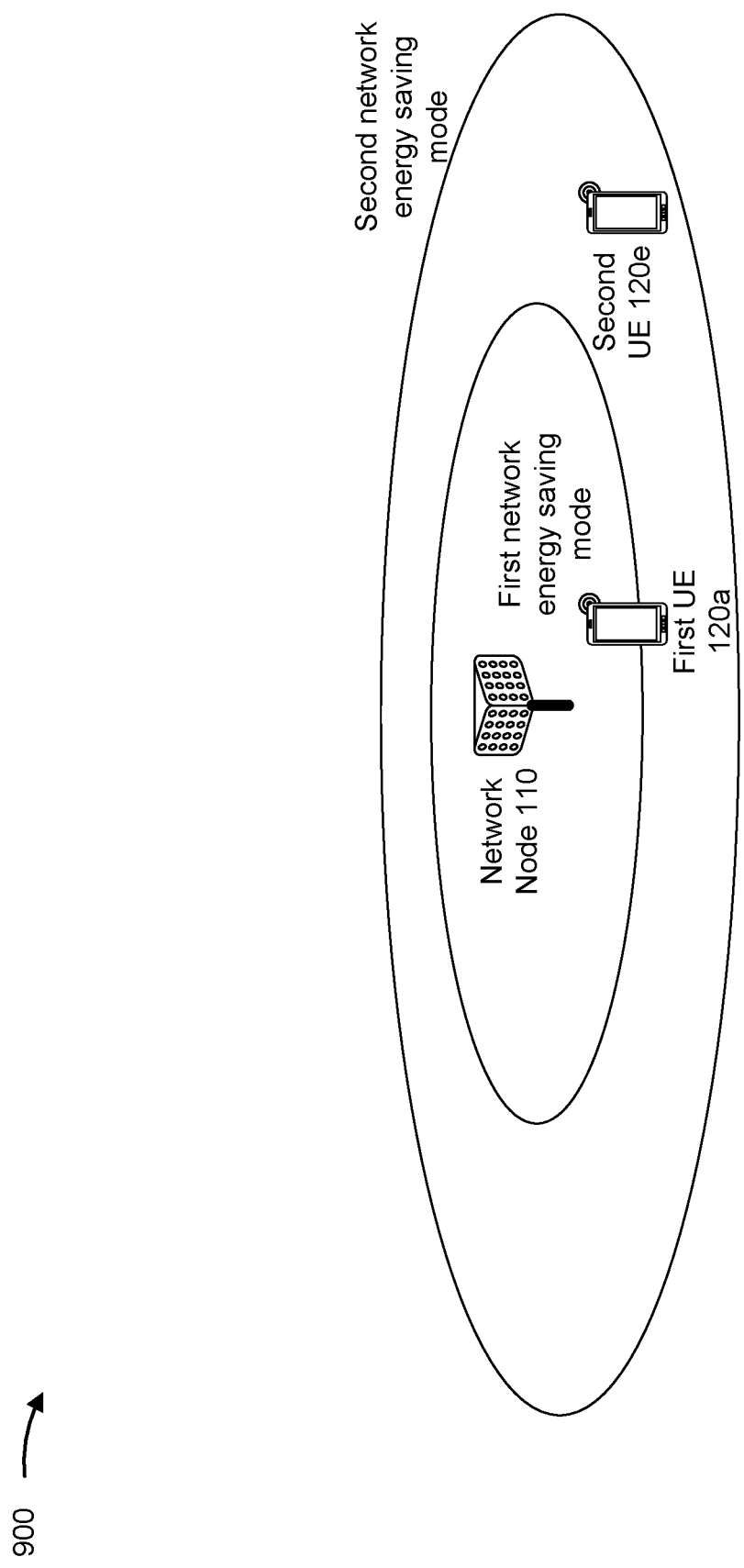
FIG. 9 is a diagram illustrating an example of switching between network energy saving modes, in accordance with the present disclosure.

FIG. 9 is a diagram illustrating an example 900 of switching between network energy saving modes, in accordance with the present disclosure.

As shown in FIG. 9, a network node 110 may switch between network energy saving modes. The network node 110 may switch from a second network energy saving mode to a first network energy saving mode, in which case a second UE 120e may become out of coverage while a first UE 120a may still remain in-coverage. The second network energy saving mode may support both the first UE 120a and the second UE 120e, but the first network energy saving mode may only support the first UE 120a. When switching from the second network energy saving mode to the first network energy saving mode, a coverage area may change, such that the first UE 120a is still in-coverage but the second UE 120e is no longer in-coverage. When switching between the network energy saving modes, the network node 110 may change a number of transmit instruction units (TXIUs), receive instruction units (RXIUs), and/or TXRUs in general, as well as a transmit power, which may cause the change to the coverage area.

As indicated above, FIG. 9 is provided as an example. Other examples may differ from what is described with regard to FIG. 9.

A UE may become out-of-coverage after a network node changes to a different network energy saving mode. The UE may receive a synchronization signal block (SSB) and perform an initial access using a certain waveform. A downlink may be expected to support additional single-carrier waveforms, such as DFT-s-OFDM waveforms and/or SC-QAM waveforms. However, the UE may not be aware of which specific waveform is being used by the network node, so the UE may need to perform a blind hypothesis on waveforms, which may increase an amount of signaling for the UE and waste power at the UE.

In various aspects of techniques and apparatuses described herein, a first UE (e.g., an in-coverage UE or relay UE) may transmit, to a second UE (e.g., an out-of-coverage UE) and via a sidelink interface between the first UE and the second UE, an indication of a waveform associated with a network node. The indication may indicate whether the waveform is used by the network node in a Uu link associated with the network node, where the Uu link may be associated with a network-node-to-UE link. The indication may indicate that the waveform associated with the network node is a single-carrier waveform (e.g., a DFT-s-OFDM waveform or an SC-QAM waveform). The indication may indicate that the waveform associated with the network node is a non-single-carrier waveform. The second UE may receive, from the first UE, the indication of the waveform associated with the network node. The second UE may perform, to the network node, a transmission based at least in part on the waveform associated with the network node. The second UE may perform the transmission as part of an initial access. The second UE may avoid attempting multiple waveforms for the initial access, which may save resources at the second UE. hypothesis In some aspects, UEs may move to out-of-coverage, after being in-coverage, and vice versa, based at least in part on a switching of a network energy saving mode. An in-coverage UE (e.g., the first UE) or relay UE may inform an out-of-coverage UE (e.g., the second UE) regarding the waveform currently being used by the network node. The in-coverage UE may conditionally relay, via the sidelink interface, useful information to the out-of-coverage UE under certain network energy saving modes. As a result, the out-of-coverage UE may be able to use the waveform when transitioning back to a connected mode. The out-of-coverage UE may use the waveform when performing a random access channel (RACH) procedure for entering the connected mode. The in-coverage UE may signal, to the out-of-coverage UE, the waveform used in an SSB and an initial access, which may allow the out-of-coverage UE to avoid performing a blind hypothesis on waveforms, which may save power and reduce signaling for the out-of-coverage UE.

In some aspects, the network node may switch off some parts of its Tx chain (e.g., as a result of switching the network energy saving mode), and as a result, some UEs may become temporarily out-of-coverage. UEs which remain in-coverage may signal to the UEs that are temporarily out-of-coverage of specific waveforms to be used when accessing the network node. Information about the specific waveforms may be conveyed to the UEs that are temporarily out-of-coverage via a PSBCH and a corresponding DMRS. During the RACH procedure, the out-of-coverage UEs may obtain additional information about the waveforms.

Figure 10:
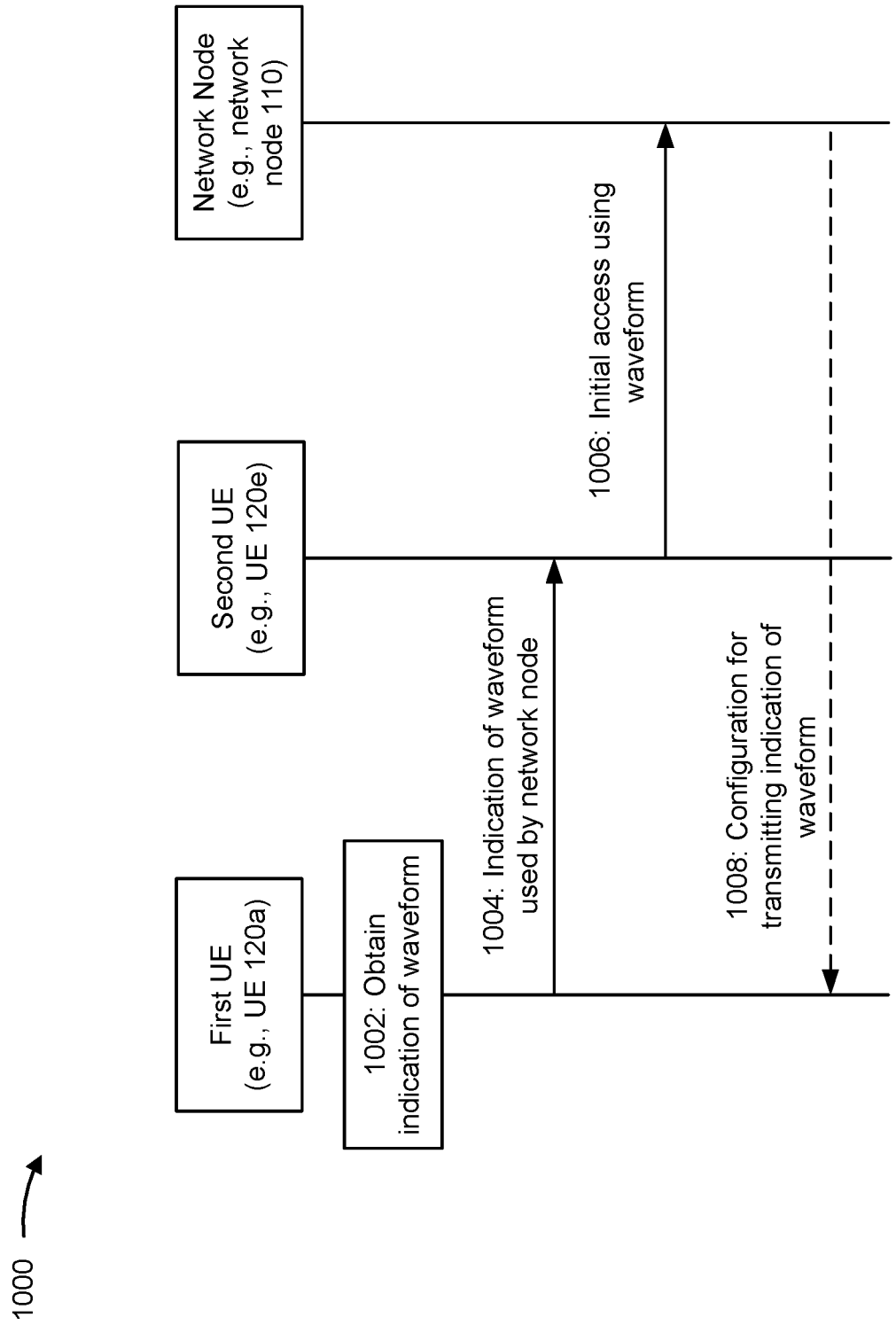
FIG. 10 is a diagram illustrating an example associated with transmitting an indication of a waveform used by a network node, in accordance with the present disclosure.

FIG. 10 is a diagram illustrating an example associated with transmitting an indication of a waveform used by a network node, in accordance with the present disclosure. As shown in FIG. 10, example 1000 includes communication between a first UE (e.g., UE 120a), a second UE (e.g., UE 120e), and a network node (e.g., network node 110). In some aspects, the first UE, the second UE, and the network node may be included in a wireless network, such as wireless network 100.

As shown by reference number 1002, the first UE may obtain an indication of a waveform associated with the network node. The indication may indicate whether the waveform is used by the network node in a Uu link associated with the network node. The first UE may obtain the indication of the waveform from a memory of the UE. The first UE may obtain the indication of the waveform from received configuration information (e.g., from the network node).

As shown by reference number 1004, the first UE may transmit, to the second UE and via a sidelink interface between the first UE and the second UE, the indication of the waveform associated with the network node. The first UE may be an in-coverage UE or a relay UE, and the second UE may be an out-of-coverage UE. The indication may indicate whether the waveform is used by the network node in the Uu link associated with the network node. The Uu link may be a network-node-to-UE link associated with the network node. The indication may indicate that the waveform is a single-carrier waveform, such as a DFT-s-OFDM waveform or an SC-QAM waveform. The indication may indicate that the waveform is a non-single-carrier waveform, such as a CP-OFDM waveform. The indication may be associated with K bits to indicate $2^K$ waveforms. In some aspects, the first UE may already have information regarding the waveform used by the network node because the first UE may be in-coverage and may use the waveform to communicate with the network node.

In some aspects, the first UE may transmit, to the second UE, the indication regarding the use of single-carrier waveforms in the Uu link, where the indication may be formed using one or more bits. The indication may indicate whether the network node uses the single-carrier waveform or the non-single-carrier waveform when transmitting an SSB via the Uu link. The indication may indicate whether the network node uses the single-carrier waveform or the non-single-carrier waveform, which may allow the second UE to avoid trying multiple waveform hypotheses for the initial access. In some aspects, when the network node uses the single-carrier waveform, the network node may indicate a single-carrier waveform type (e.g., DFT-s-OFDM, SC-QAM, or other single-carrier waveform types). In some aspects, the first UE may use the K bits to indicate the $2^K$ waveforms.

In some aspects, the indication may include a bitmap that indicates a first bit value or a second bit value for a message in a random access channel (RACH) procedure or an initial access, or for a downlink shared channel for a band or a band combination. The first bit value may correspond to a first waveform type and the second bit value may correspond to a second waveform type. The message in the RACH procedure or the initial access may correspond to an SSB, a system information block (SIB) type 1 (SIB1), a message 2 (msg2), a message 4 (msg4), a message B (msgB) or other SIBs (OSIBs). The msg2 and the msg4 may be associated with a four-step RACH procedure. The msgB may be associated with a two-step RACH procedure. In some aspects, the first UE may indicate, to the second UE, the bitmap, which may include a "1" for a single-carrier waveform or a "0" for a non-single-carrier waveform (or K bits for each waveform) for each message in the RACH procedure or the initial access (e.g., SSB, SIB1, msg2, msg4, or OSIBs), or for a physical downlink shared channel (PDSCH) for one or more bands or band combinations.

In some aspects, the first UE may transmit the indication of the waveform associated with the network node via RRC signaling, a medium access control control element (MAC-CE), sidelink control information (SCI), or a dedicated sidelink shared channel. In some aspects, the first UE, which may store information regarding types of waveforms used in the Uu link's initial access and downlink signals, may transmit this information to other UEs including the second UE over a PC5 interface using the RRC signaling, the MAC-CE, the SCI (e.g., SCI type 1 or SCI type 2), a dedicated PSSCH, or a new physical (PHY) channel. In some aspects, the first UE may transmit the indication of the waveform associated with the network node via a sidelink broadcast channel payload associated with an SSB. For example, the first UE may transmit the indication of the waveform as part of an SSB's PSBCH payload.

In some aspects, the indication of the waveform associated with the network node may be based at least in part on an S-PSS or an S-SSS in a known shuffled order. The indication may indicate the waveform associated with an SSB signal in the Uu link. The known shuffled order may be one of a plurality of dedicated patterns of symbol/sequence shuffling for indicating the waveform associated with the network node. In some aspects, the first UE (e.g., an SSB Tx UE) may transmit the S-PSS/S-SSS symbols/sequences in the known shuffled order (e.g., down to up) to indicate to the second UE whether the SSB signal in the Uu link corresponds to the single-carrier waveform or the non-single-carrier waveform. Multiple patterns of shuffling or different sequences of S-PSS/S-SSS (e.g., S-PSS only, S-SSS only, or both S-PSSS/S-SSS jointly) may be dedicated or defined for indicating a type of waveform (e.g., single-carrier waveform or non-single carrier waveform), a type of single-carrier waveform (e.g., DFT-s-OFDM), and/or a type of non-single carrier waveform (e.g., CP-OFDM). The first UE may change a mapping of the S-PSS/S-SSS to indicate the waveform used in the SSB signal in the Uu link.

In some aspects, the indication of the waveform associated with the network node may be based at least in part on a sidelink broadcast channel DMRS mapping, a sidelink broadcast channel DMRS configuration, or sidelink broadcast channel DMRS sequences. In other words, the first UE may use a sidelink PSBCH's DMRS mapping, configuration, or sequences to indicate the Uu link's SSB waveform (e.g., single-carrier or non-single-carrier). The first UE may change a mapping of a PSBCH-DMRS to indicate the waveform used in the SSB signal in the Uu link.

In some aspects, the first UE may receive, from the second UE, a request for the waveform associated with the network node. The first UE may transmit the indication of the waveform associated with the network node based at least in part on the request. In some aspects, the indication of the waveform may be an on-demand waveform type indication. The first UE or the second UE may request, from other UEs in sidelink using the PC5 interface, the type of each waveform in the initial access of the Uu link or for data (e.g., via a PDSCH) on each band or band combination. In other words, an out-of-coverage UE or an in-coverage UE may request, from the other UEs, the type of each waveform in the initial access of the Uu link or for the data on each band or band combination. The first UE may transmit an on-demand request for the type of waveform via the PC5 interface, where the on-demand request may be transmitted via RRC signaling, a MAC-CE, SCI, the dedicated PSSCH, or the new PHY channel.

As shown by reference number 1006, the second UE may perform, to the network node, a transmission based at least in part on the waveform associated with the network node. The second UE may perform the transmission as part of an initial access. The second UE may perform the transmission using the waveform associated with the network node. The second UE may use the waveform indicated by the first UE, which may allow the UE to avoid trying multiple waveform hypotheses for the initial access. In some aspects, the second UE may receive, from the network node and during the RACH procedure or the initial access, additional information regarding waveforms used by the network node. For example, in RACH messages, the second UE may obtain additional information regarding waveforms of upcoming transmissions.

As shown by reference number 1008, the first UE may receive, from the network node, a configuration for transmitting the indication of the waveform associated with the network node to the second UE. The configuration may indicate a resource pool for transmitting the indication of the waveform associated with the network node. The first UE may transmit the indication of the waveform used by the network node based at least in part on the configuration received from the network node. In some aspects, the network node may enable the first UE to share information regarding the waveform associated with the network node. The first UE may share the information regarding the waveform associated with the network node based at least in part on a resource pool configuration, which may be a network node RRC configuration for a plurality of UEs using the resource pool. When enabled, the first UE may use RRC signaling, a MAC-CE, SCI, a PSSCH, or user assistance information via the PC5 interface between UEs to share the information regarding the waveform associated with the network node. Alternatively, the first UE may use a new dedicated channel or a PHY channel to share the information regarding the waveform associated with the network node.

In some aspects, the first UE may receive, from the network node, a dynamic indication. The first UE may transmit the indication of the waveform associated with the network node to one or more UEs including the second UE based at least in part on the dynamic indication. The dynamic indication may be for the first UE to transmit the indication of the waveform associated with the network node to a plurality of UEs (e.g., all UEs), to certain UEs, or to UEs that are expected to be in-coverage soon (after being out-of-coverage). The network node may store a list of UEs based at least in part on a history of communications or positioning, where UEs on the list of UEs may have previously been in-coverage but may have then become out-of-coverage after a change to a network energy/power saving mode.

In some aspects, the first UE may transmit the indication of the waveform associated with the network node based at least in part on stored information regarding a scheduled change to a network energy saving mode of the network node. For example, the first UE may transmit, to the second UE, the indication of the waveform associated with the network node based at least in part on knowledge that the network node is moving to a next network energy saving mode, and that the second UE that was in-coverage and then out-of-coverage will become in-coverage again. In other words, depending on a schedule of network energy saving mode changes, the first UE may automatically transmit the indication of the waveform associated with the network node to other UEs, such as the second UE.

As indicated above, FIG. 10 is provided as an example. Other examples may differ from what is described with regard to FIG. 10.

Figure 11:
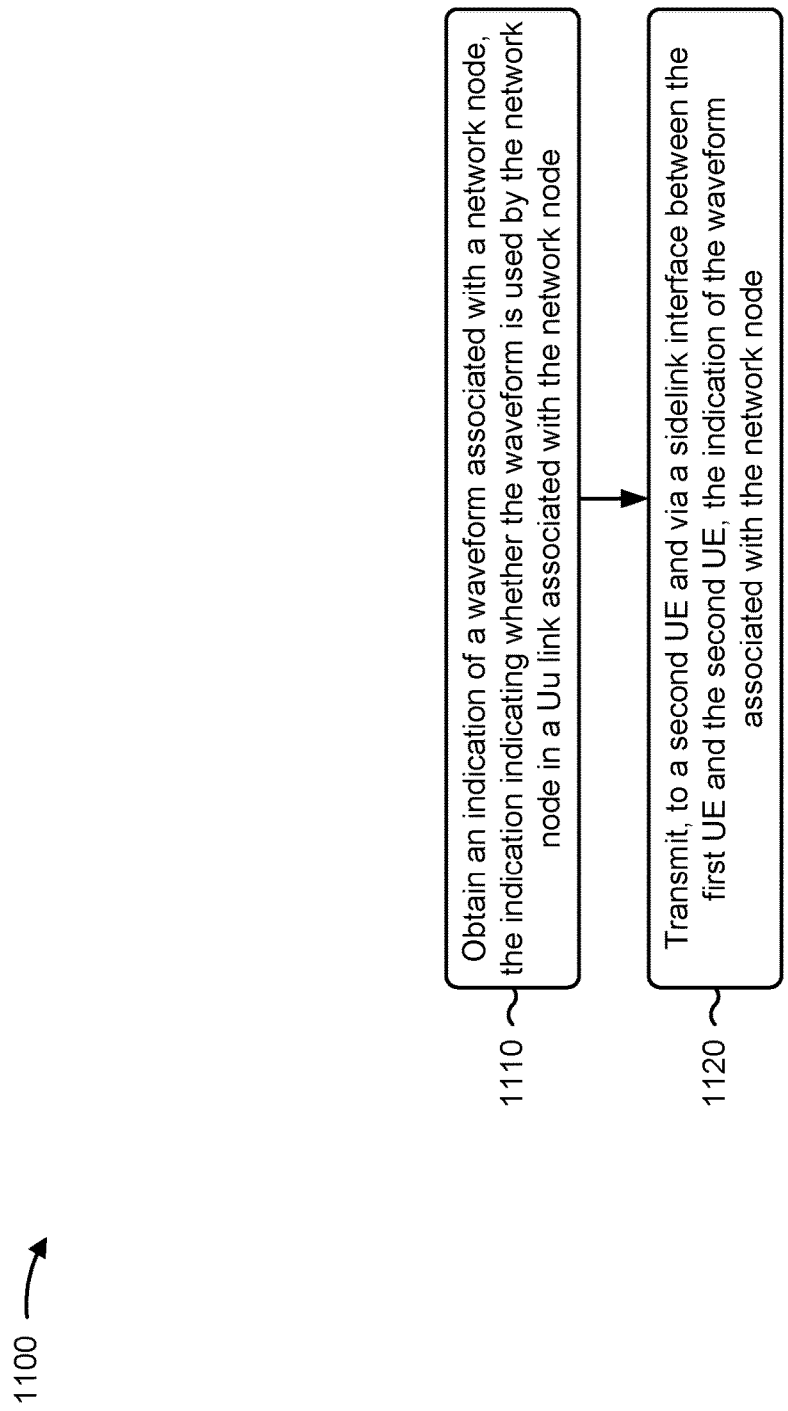
FIGS. 11-12 are diagrams illustrating example processes associated with transmitting an indication of a waveform used by a network node, in accordance with the present disclosure.

FIG. 11 is a diagram illustrating an example process 1100 performed, for example, by a first UE, in accordance with the present disclosure. Example process 1100 is an example where the first UE (e.g., first UE 120*a*) performs operations associated with transmitting an indication of a waveform used by a network node.

As shown in FIG. 11, in some aspects, process 1100 may include obtaining an indication of a waveform associated with a network node, the indication indicating whether the waveform is used by the network node in a Uu link associated with the network node (block 1110). For example, the first UE (e.g., using obtain component 1308, depicted in FIG. 13) may obtain an indication of a waveform associated with a network node, the indication indicating whether the waveform is used by the network node in a Uu link associated with the network node, as described above.

As shown in FIG. 11, in some aspects, process 1100 may include transmitting, to a second UE and via a sidelink interface between the first UE and the second UE, the indication of the waveform associated with the network node (block 1120). For example, the first UE (e.g., using transmission component 1304, depicted in FIG. 13) may transmit, to a second UE and via a sidelink interface between the first UE and the second UE, the indication of the waveform associated with the network node, as described above.

Process 1100 may include additional aspects, such as any single aspect or any combination of aspects described below and/or in connection with one or more other processes described elsewhere herein.

In a first aspect, the first UE is an in-coverage UE or a relay node, and the second UE is an out-of-coverage UE.

In a second aspect, alone or in combination with the first aspect, the indication indicates that the waveform is a single-carrier waveform, and the single-carrier waveform is a DFT-s-OFDM waveform or an SC-QAM waveform.

In a third aspect, alone or in combination with one or more of the first and second aspects, the indication indicates that the waveform is a non-single-carrier waveform, and the non-single-carrier waveform is a CP-OFDM waveform.

In a fourth aspect, alone or in combination with one or more of the first through third aspects, the indication is associated with K bits to indicate $2^K$ waveforms.

In a fifth aspect, alone or in combination with one or more of the first through fourth aspects, the indication includes a bitmap that indicates a first bit value or a second bit value for a message in a random access procedure or an initial access, or for a downlink shared channel for a band or a band combination, and the first bit value corresponds to a first waveform type and the second bit value corresponds to a second waveform type.

In a sixth aspect, alone or in combination with one or more of the first through fifth aspects, the message in the random access procedure or the initial access corresponds to one of an SSB, a SIB type 1, a message 2, a message 4, or other SIBs.

In a seventh aspect, alone or in combination with one or more of the first through sixth aspects, process 1100 includes transmitting the indication of the waveform associated with the network node via RRC signaling, a MAC-CE, SCI, or a dedicated sidelink shared channel.

In an eighth aspect, alone or in combination with one or more of the first through seventh aspects, process 1100 includes transmitting the indication of the waveform associated with the network node via a sidelink broadcast channel payload associated with an SSB.

In a ninth aspect, alone or in combination with one or more of the first through eighth aspects, the indication of the waveform associated with the network node is based at least in part on an S-PSS or an S-SSS in a known shuffled order, wherein the indication indicates the waveform associated with an SSB signal in the Uu link, and the known shuffled order is one of a plurality of dedicated patterns of symbol/sequence shuffling for indicating the waveform associated with the network node.

In a tenth aspect, alone or in combination with one or more of the first through ninth aspects, the indication of the waveform associated with the network node is based at least in part on a sidelink broadcast channel DMRS mapping, a sidelink broadcast channel DMRS configuration, or sidelink broadcast channel DMRS sequences.

In an eleventh aspect, alone or in combination with one or more of the first through tenth aspects, process 1100 includes receiving, from the second UE, a request for the waveform associated with the network node, wherein the indication is transmitted to the second UE based at least in part on the request.

In a twelfth aspect, alone or in combination with one or more of the first through eleventh aspects, process 1100 includes receiving, from the network node, a configuration for transmitting the indication of the waveform associated with the network node to the second UE, wherein the configuration indicates a resource pool for transmitting the indication of the waveform associated with the network node.

In a thirteenth aspect, alone or in combination with one or more of the first through twelfth aspects, process 1100 includes receiving, from the network node, a dynamic indication, wherein the indication of the waveform associated with the network node is transmitted to one or more UEs including the second UE based at least in part on the dynamic indication.

In a fourteenth aspect, alone or in combination with one or more of the first through thirteenth aspects, process 1100 includes transmitting the indication of the waveform associated with the network node based at least in part on stored information regarding a scheduled change to a network energy saving mode of the network node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
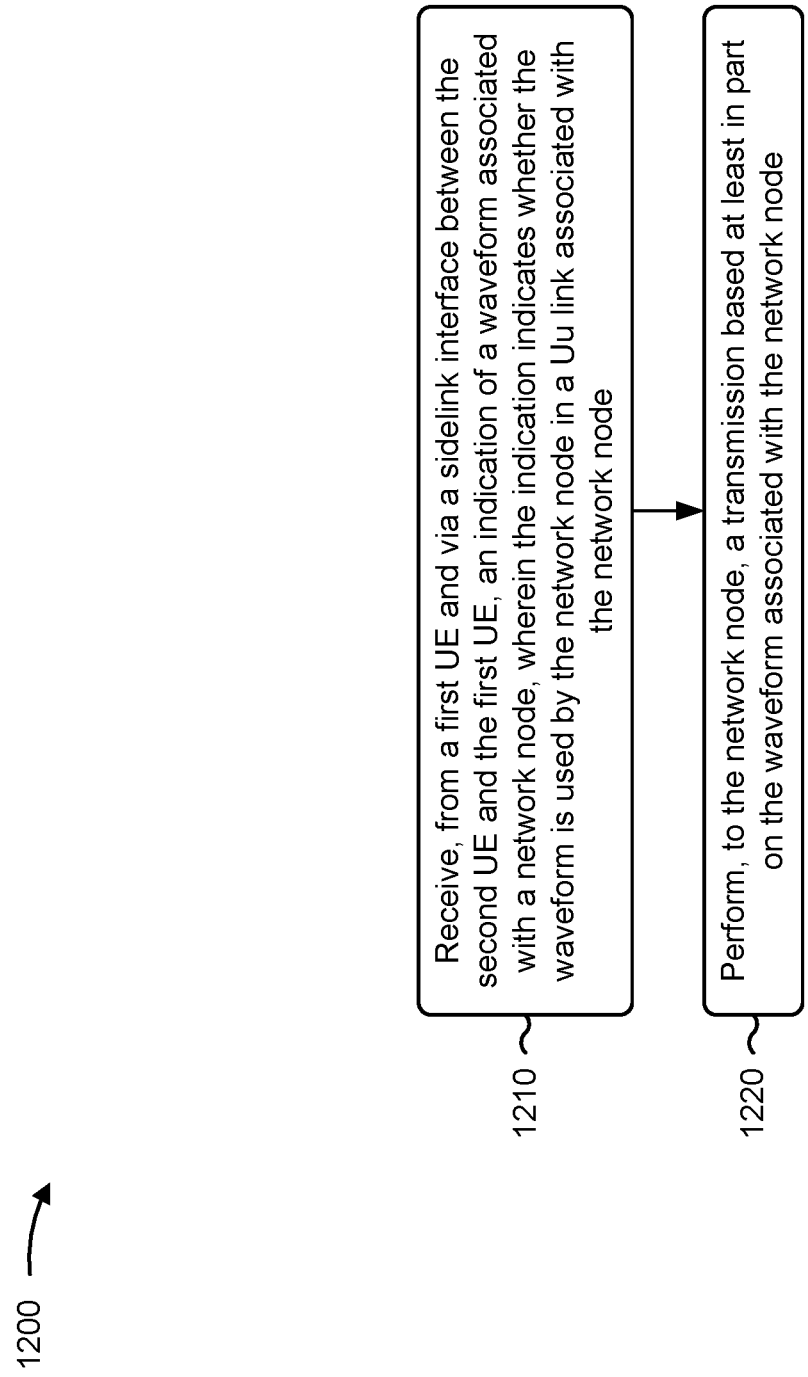

FIG. 12 is a diagram illustrating an example process 1200 performed, for example, by a second UE, in accordance with the present disclosure. Example process 1200 is an example where the second UE (e.g., second UE 120*e*) performs operations associated with transmitting an indication of a waveform used by a network node.

As shown in FIG. 12, in some aspects, process 1200 may include receiving, from a first UE and via a sidelink interface between the second UE and the first UE, an indication of a waveform associated with a network node, wherein the indication indicates whether the waveform is used by the network node in a Uu link associated with the network node (block 1210). For example, the second UE (e.g., using reception component 1402, depicted in FIG. 14) may receive, from a first UE and via a sidelink interface between the second UE and the first UE, an indication of a waveform associated with a network node, wherein the indication indicates whether the waveform is used by the network node in a Uu link associated with the network node, as described above.

As further shown in FIG. 12, in some aspects, process 1200 may include performing, to the network node, a transmission based at least in part on the waveform associated with the network node (block 1220). For example, the second UE (e.g., using transmission component 1404, depicted in FIG. 14) may perform, to the network node, a transmission based at least in part on the waveform associated with the network node, as described above.

Process 1200 may include additional aspects, such as any single aspect or any combination of aspects described below and/or in connection with one or more other processes described elsewhere herein.

In a first aspect, process 1200 includes receiving, from the network node and during a RACH procedure, additional information regarding waveforms used by the network node.

In a second aspect, alone or in combination with the first aspect, the indication indicates that the waveform is a single-carrier waveform, and the single-carrier waveform is a DFT-s-OFDM waveform or an SC-QAM waveform.

In a third aspect, alone or in combination with one or more of the first and second aspects, the indication indicates that the waveform is a non-single-carrier waveform, and the non-single-carrier waveform is a CP-OFDM waveform.

In a fourth aspect, alone or in combination with one or more of the first through third aspects, the indication includes a bitmap that indicates a first bit value or a second bit value for a message in a random access procedure or an initial access, or for a downlink shared channel for a band or a band combination, and the first bit value corresponds to a first waveform type and the second bit value corresponds to a second waveform type.

In a fifth aspect, alone or in combination with one or more of the first through fourth aspects, process 1200 includes receiving the indication of the waveform associated with the network node via RRC signaling, a MAC-CE, SCI, or a dedicated sidelink shared channel.

In a sixth aspect, alone or in combination with one or more of the first through fifth aspects, process 1200 includes receiving the indication of the waveform associated with the network node via a sidelink broadcast channel payload associated with an SSB.

In a seventh aspect, alone or in combination with one or more of the first through sixth aspects, the indication of the waveform associated with the network node is based at least in part on an S-PSS or an S-SSS in a known shuffled order, wherein the indication indicates the waveform associated with an SSB signal in the Uu link, and the known shuffled order is one of a plurality of dedicated patterns of symbol/sequence shuffling for indicating the waveform associated with the network node.

In an eighth aspect, alone or in combination with one or more of the first through seventh aspects, the indication of the waveform associated with the network node is based at least in part on a sidelink broadcast channel DMRS mapping, a sidelink broadcast channel DMRS configuration, or sidelink broadcast channel DMRS sequences.

In a ninth aspect, alone or in combination with one or more of the first through eighth aspects, process 1200 includes transmitting, to the first UE, a request for the waveform associated with the network node, wherein the indication is received from the first UE based at least in part on the request.

In a tenth aspect, alone or in combination with one or more of the first through ninth aspects, the indication of the waveform associated with the network node is based at least in part on a configuration that indicates a resource pool for transmitting the indication of the waveform associated with the network node.

In an eleventh aspect, alone or in combination with one or more of the first through tenth aspects, the indication of the waveform associated with the network node is based at least in part on a dynamic indication from the network node.

In a twelfth aspect, alone or in combination with one or more of the first through eleventh aspects, process 1200 includes receiving the indication of the waveform associated with the network node based at least in part on stored information regarding a scheduled change to a network energy saving mode of the network node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
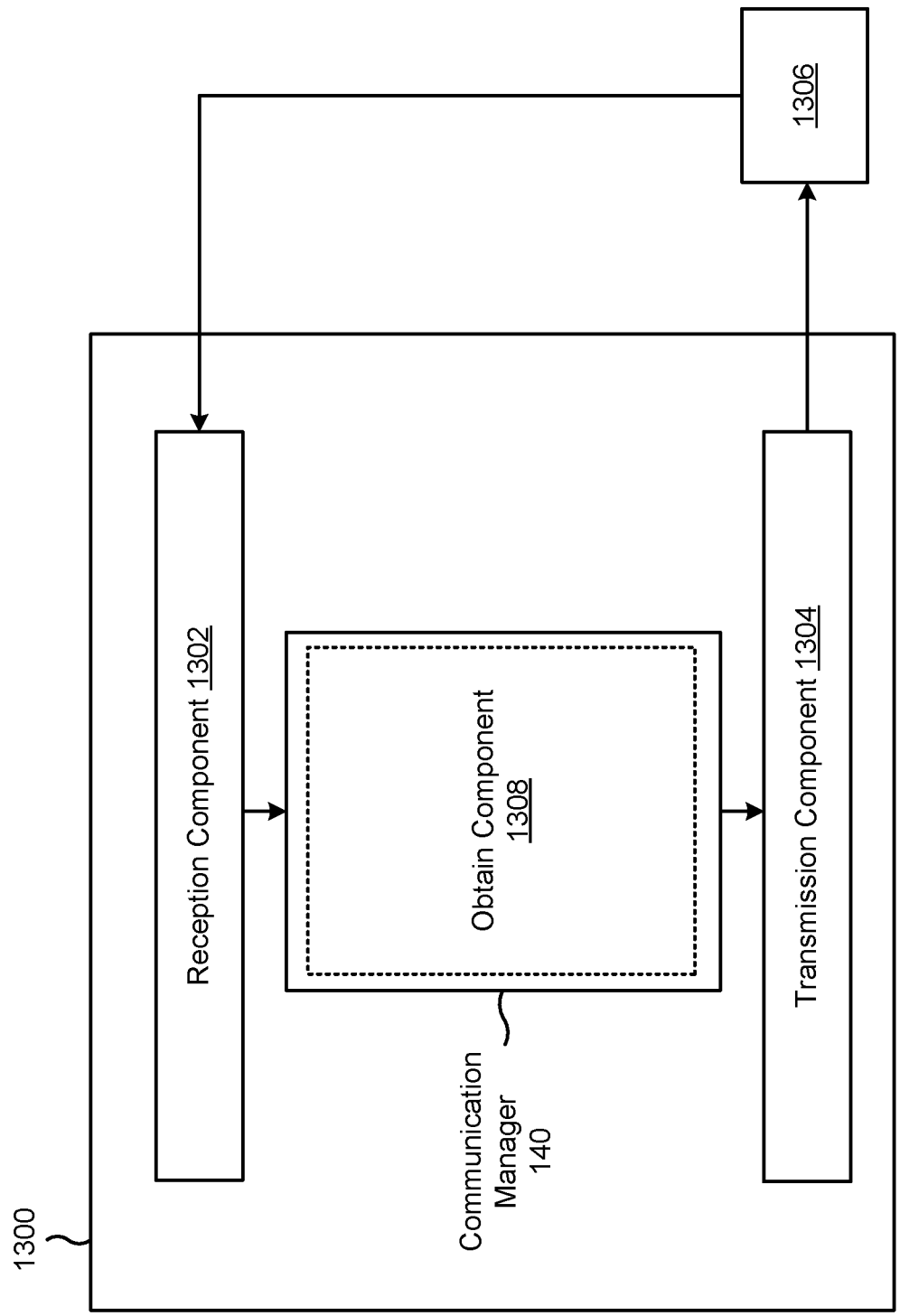
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a first UE, or a first UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include an obtain component 1308, among other examples.

In some aspects, the apparatus 1300 may be configured to perform one or more operations described herein in connection with FIG. 10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the first UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the first UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the first UE described in connection with FIG. 2. In some aspects, the transmission component 1304 may be co-located with the reception component 1302 in a transceiver.

The obtain component 1308 may obtain an indication of a waveform associated with a network node, the indication indicating whether the waveform is used by the network node in a Uu link associated with the network node. The transmission component 1304 may transmit, to a second UE and via a sidelink interface between the first UE and the second UE, the indication of the waveform associated with the network node.

The reception component 1302 may receive, from the second UE, a request for the waveform associated with the network node, wherein the indication is transmitted to the second UE based at least in part on the request. The reception component 1302 may receive, from the network node, a configuration for transmitting the indication of the waveform associated with the network node to the second UE, wherein the configuration indicates a resource pool for transmitting the indication of the waveform associated with the network node. The reception component 1302 may receive, from the network node, a dynamic indication, wherein the indication of the waveform associated with the network node is transmitted to one or more UEs including the second UE based at least in part on the dynamic indication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
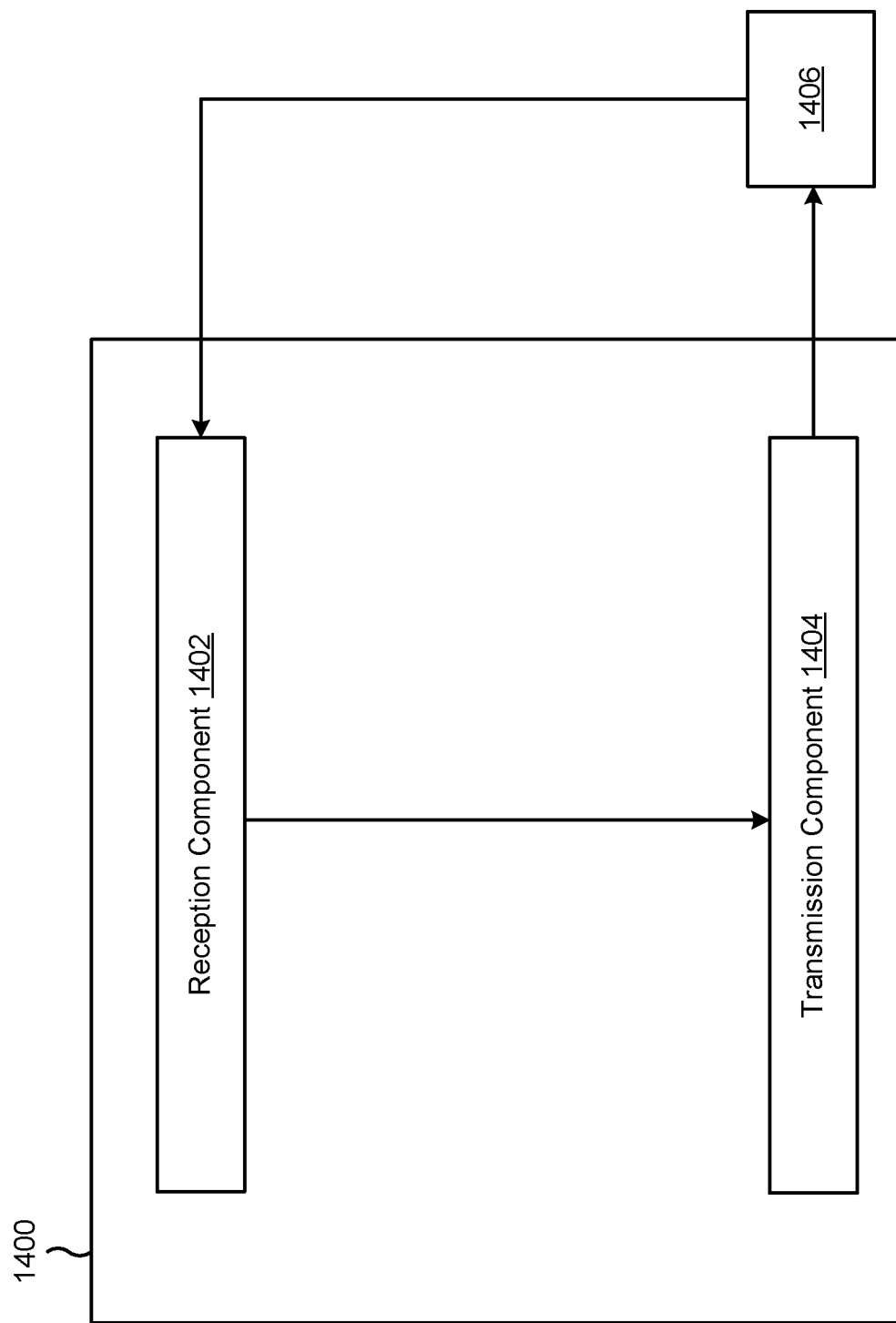

FIG. 14 is a diagram of an example apparatus 1400 for wireless communication, in accordance with the present disclosure. The apparatus 1400 may be a second UE, or a second UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIG. 10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the second UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the second UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the second UE described in connection with FIG. 2. In some aspects, the transmission component 1404 may be co-located with the reception component 1402 in a transceiver.

The reception component 1402 may receive, from a first UE and via a sidelink interface between the second UE and the first UE, an indication of a waveform associated with a network node, wherein the indication indicates whether the waveform is used by the network node in a Uu link associated with the network node. The transmission component 1404 may perform, to the network node, a transmission based at least in part on the waveform associated with the network node. The reception component 1402 may receive, from the network node and during a RACH procedure, additional information regarding waveforms used by the network node. The transmission component 1404 may transmit, to the first UE, a request for the waveform associated with the network node, wherein the indication is received from the first UE based at least in part on the request.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an apparatus of a first user equipment (UE), comprising: obtaining an indication of a waveform associated with a network node, the indication indicating whether the waveform is used by the network node in a Uu link associated with the network node; and transmitting, to a second UE and via a sidelink interface between the first UE and the second UE, the indication of the waveform associated with the network node.

Aspect 2: The method of Aspect 1, wherein the first UE is an in-coverage UE or a relay node, and the second UE is an out-of-coverage UE.

Aspect 3: The method of any of Aspects 1 through 2, wherein the indication indicates that the waveform is a single-carrier waveform, and wherein the single-carrier waveform is a discrete Fourier transform spread orthogonal frequency division multiplexing waveform or a single carrier quadrature amplitude modulation waveform.

Aspect 4: The method of any of Aspects 1 through 3, wherein the indication indicates that the waveform is a non-single-carrier waveform, and wherein the non-single-carrier waveform is a cyclic prefix orthogonal frequency division multiplexing waveform.

Aspect 5: The method of any of Aspects 1 through 4, wherein the indication is associated with K bits to indicate $2^K$ waveforms.

Aspect 6: The method of any of Aspects 1 through 5, wherein the indication includes a bitmap that indicates a first bit value or a second bit value for a message in a random access procedure or an initial access, or for a downlink shared channel for a band or a band combination, and wherein the first bit value corresponds to a first waveform type and the second bit value corresponds to a second waveform type.

Aspect 7: The method of Aspect 6, wherein the message in the random access procedure or the initial access corresponds to one of: a synchronization signal block, a system information block (SIB) type 1, a message 2, a message 4, or other Ms.

Aspect 8: The method of any of Aspects 1 through 7, wherein transmitting the indication of the waveform associated with the network node is via radio resource control signaling, a medium access control control element, sidelink control information, or a dedicated sidelink shared channel.

Aspect 9: The method of any of Aspects 1 through 8, wherein transmitting the indication of the waveform associated with the network node is via a sidelink broadcast channel payload associated with a synchronization signal block.

Aspect 10: The method of any of Aspects 1 through 9, wherein the indication of the waveform associated with the network node is based at least in part on a sidelink primary synchronization signal or a sidelink secondary synchronization signal in a known shuffled order, wherein the indication indicates the waveform associated with a synchronization signal block signal in the Uu link, and wherein the known shuffled order is one of a plurality of dedicated patterns of symbol/sequence shuffling for indicating the waveform associated with the network node.

Aspect 11: The method of any of Aspects 1 through 10, wherein the indication of the waveform associated with the network node is based at least in part on a sidelink broadcast channel demodulation reference signal (DMRS) mapping, a sidelink broadcast channel DMRS configuration, or sidelink broadcast channel DMRS sequences.

Aspect 12: The method of any of Aspects 1 through 11, further comprising: receiving, from the second UE, a request for the waveform associated with the network node, wherein the indication is transmitted to the second UE based at least in part on the request.

Aspect 13: The method of any of Aspects 1 through 12, further comprising: receiving, from the network node, a configuration for transmitting the indication of the waveform associated with the network node to the second UE, wherein the configuration indicates a resource pool for transmitting the indication of the waveform associated with the network node.

Aspect 14: The method of any of Aspects 1 through 13, further comprising: receiving, from the network node, a dynamic indication, wherein the indication of the waveform associated with the network node is transmitted to one or more UEs including the second UE based at least in part on the dynamic indication.

Aspect 15: The method of any of Aspects 1 through 14, wherein transmitting the indication of the waveform associated with the network node is based at least in part on stored information regarding a scheduled change to a network energy saving mode of the network node.

Aspect 16: A method of wireless communication performed by an apparatus of a second user equipment (UE), comprising: receiving, from a first UE and via a sidelink interface between the second UE and the first UE, an indication of a waveform associated with a network node, wherein the indication indicates whether the waveform is used by the network node in a Uu link associated with the network node; and performing, to the network node, a transmission based at least in part on the waveform associated with the network node.

Aspect 17: The method of Aspect 16, further comprising: receiving, from the network node and during a random access channel procedure, additional information regarding waveforms used by the network node.

Aspect 18: The method of any of Aspects 16 through 17, wherein the indication indicates that the waveform is a single-carrier waveform, and wherein the single-carrier waveform is a discrete Fourier transform spread orthogonal frequency division multiplexing waveform or a single carrier quadrature amplitude modulation waveform.

Aspect 19: The method of any of Aspects 16 through 18, wherein the indication indicates that the waveform is a non-single-carrier waveform, and wherein the non-single-carrier waveform is a cyclic prefix orthogonal frequency division multiplexing waveform.

Aspect 20: The method of any of Aspects 16 through 19, wherein the indication includes a bitmap that indicates a first bit value or a second bit value for a message in a random access procedure or an initial access, or for a downlink shared channel for a band or a band combination, and wherein the first bit value corresponds to a first waveform type and the second bit value corresponds to a second waveform type.

Aspect 21: The method of any of Aspects 16 through 20, wherein receiving the indication of the waveform associated with the network node is via radio resource control signaling, a medium access control control element, sidelink control information, or a dedicated sidelink shared channel.

Aspect 22: The method of any of Aspects 16 through 21, wherein receiving the indication of the waveform associated with the network node is via a sidelink broadcast channel payload associated with a synchronization signal block.

Aspect 23: The method of any of Aspects 16 through 22, wherein the indication of the waveform associated with the network node is based at least in part on a sidelink primary synchronization signal or a sidelink secondary synchronization signal in a known shuffled order, wherein the indication indicates the waveform associated with a synchronization signal block signal in the Uu link, and wherein the known shuffled order is one of a plurality of dedicated patterns of symbol/sequence shuffling for indicating the waveform associated with the network node.

Aspect 24: The method of any of Aspects 16 through 23, wherein the indication of the waveform associated with the network node is based at least in part on a sidelink broadcast channel demodulation reference signal (DMRS) mapping, a sidelink broadcast channel DMRS configuration, or sidelink broadcast channel DMRS sequences.

Aspect 25: The method of any of Aspects 16 through 24, further comprising: transmitting, to the first UE, a request for the waveform associated with the network node, wherein the indication is received from the first UE based at least in part on the request.

Aspect 26: The method of any of Aspects 16 through 25, wherein the indication of the waveform associated with the network node is based at least in part on a configuration that indicates a resource pool for transmitting the indication of the waveform associated with the network node.

Aspect 27: The method of any of Aspects 16 through 26, wherein the indication of the waveform associated with the network node is based at least in part on a dynamic indication from the network node.

Aspect 28: The method of any of Aspects 16 through 27, wherein receiving the indication of the waveform associated with the network node is based at least in part on stored information regarding a scheduled change to a network energy saving mode of the network node.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
a memory; and
one or more processors, coupled to the memory, configured to:
obtain an indication of a waveform associated with a network node, the indication indicating whether the waveform is used by the network node in a Uu link associated with the network node, and wherein the indication includes a bitmap that indicates at least a first bit value or a second bit value for a message in a random access procedure or an initial access, or for a downlink shared channel for a band or a band combination, and wherein the first bit value corresponds to a first waveform type and the second bit value corresponds to a second waveform type; and
transmit, to a second UE and via a sidelink interface between the first UE and the second UE, the indication of the waveform associated with the network node.

2. The apparatus of claim 1, wherein the first UE is an in-coverage UE or a relay UE, and the second UE is an out-of-coverage UE.

3. The apparatus of claim 1, wherein the indication further indicates that the waveform is a single-carrier waveform, and wherein the single-carrier waveform is a discrete Fourier transform spread orthogonal frequency division multiplexing waveform or a single carrier quadrature amplitude modulation waveform.

4. The apparatus of claim 1, wherein the indication further indicates that the waveform is a non-single-carrier waveform, and wherein the non-single-carrier waveform is a cyclic prefix orthogonal frequency division multiplexing waveform.

5. The apparatus of claim 1, wherein the indication is further associated with up to K bits to indicate $2^K$ waveforms.

6. The apparatus of claim 1, wherein the message in the random access procedure or the initial access corresponds to one of: a synchronization signal block, a system information block (SIB) type 1, a message 2, a message 4, or other SIBs.

7. The apparatus of claim 1, wherein the one or more processors are configured to transmit the indication of the waveform associated with the network node via radio resource control signaling, a medium access control control element, sidelink control information, or a dedicated sidelink shared channel.

8. The apparatus of claim 1, wherein the one or more processors are configured to transmit the indication of the waveform associated with the network node via a sidelink broadcast channel payload associated with a synchronization signal block.

9. The apparatus of claim 1, wherein the indication of the waveform associated with the network node is based at least in part on a sidelink primary synchronization signal or a sidelink secondary synchronization signal in a known shuffled order, wherein the indication indicates the waveform associated with a synchronization signal block signal in the Uu link, and wherein the known shuffled order is one of a plurality of dedicated patterns of symbol/sequence shuffling for indicating the waveform associated with the network node.

10. The apparatus of claim 1, wherein the indication of the waveform associated with the network node is based at least in part on a sidelink broadcast channel demodulation reference signal (DMRS) mapping, a sidelink broadcast channel DMRS configuration, or sidelink broadcast channel DMRS sequences.

11. The apparatus of claim 1, wherein the one or more processors are further configured to:
receive, from the second UE, a request for the waveform associated with the network node, wherein the indication is transmitted to the second UE based at least in part on the request.

12. The apparatus of claim 1, wherein the one or more processors are further configured to:
receive, from the network node, a configuration for transmitting the indication of the waveform associated with the network node to the second UE, wherein the configuration indicates a resource pool for transmitting the indication of the waveform associated with the network node.

13. The apparatus of claim 1, wherein the one or more processors are further configured to:
receive, from the network node, a dynamic indication, wherein the indication of the waveform associated with the network node is transmitted to one or more UEs including the second UE based at least in part on the dynamic indication.

14. The apparatus of claim 1, wherein the one or more processors are configured to transmit the indication of the waveform associated with the network node based at least in part on stored information regarding a scheduled change to a network energy saving mode of the network node.

15. An apparatus for wireless communication at a second user equipment (UE), comprising:
a memory; and
one or more processors, coupled to the memory, configured to:
receive, from a first UE and via a sidelink interface between the second UE and the first UE, an indication of a waveform associated with a network node, wherein the indication indicates whether the waveform is used by the network node in a Uu link associated with the network node, and wherein the indication includes a bitmap that indicates at least a first bit value or a second bit value for a message in a random access procedure or an initial access, or for a downlink shared channel for a band or a band combination, and wherein the first bit value corresponds to a first waveform type and the second bit value corresponds to a second waveform type; and
perform, to the network node, a transmission based at least in part on the waveform associated with the network node.

16. The apparatus of claim 15, wherein the one or more processors are further configured to:
receive, from the network node and during a random access channel procedure, additional information regarding waveforms used by the network node.

17. The apparatus of claim 15, wherein the indication further indicates that the waveform is a single-carrier waveform, and wherein the single-carrier waveform is a discrete Fourier transform spread orthogonal frequency division multiplexing waveform or a single carrier quadrature amplitude modulation waveform.

18. The apparatus of claim 15, wherein the indication further indicates that the waveform is a non-single-carrier waveform, and wherein the non-single-carrier waveform is a cyclic prefix orthogonal frequency division multiplexing waveform.

19. The apparatus of claim 15, wherein the one or more processors are configured to receive the indication of the waveform associated with the network node via radio resource control signaling, a medium access control control element, sidelink control information, or a dedicated sidelink shared channel.

20. The apparatus of claim 15, wherein the one or more processors are configured to receive the indication of the waveform associated with the network node via a sidelink broadcast channel payload associated with a synchronization signal block.

21. The apparatus of claim 15, wherein the indication of the waveform associated with the network node is based at least in part on a sidelink primary synchronization signal or a sidelink secondary synchronization signal in a known shuffled order, wherein the indication indicates the waveform associated with a synchronization signal block signal in the Uu link, and wherein the known shuffled order is one of a plurality of dedicated patterns of symbol/sequence shuffling for indicating the waveform associated with the network node.

22. The apparatus of claim 15, wherein the indication of the waveform associated with the network node is based at least in part on a sidelink broadcast channel demodulation reference signal (DMRS) mapping, a sidelink broadcast channel DMRS configuration, or sidelink broadcast channel DMRS sequences.

23. The apparatus of claim 15, wherein the one or more processors are further configured to:
transmit, to the first UE, a request for the waveform associated with the network node, wherein the indication is received from the first UE based at least in part on the request.

24. The apparatus of claim 15, wherein the indication of the waveform associated with the network node is based at least in part on a configuration that indicates a resource pool for transmitting the indication of the waveform associated with the network node.

25. The apparatus of claim 15, wherein the indication of the waveform associated with the network node is based at least in part on a dynamic indication from the network node.

26. The apparatus of claim 15, wherein the one or more processors are configured to receive the indication of the waveform associated with the network node based at least in part on stored information regarding a scheduled change to a network energy saving mode of the network node.

27. A method of wireless communication performed by an apparatus of a first user equipment (UE), comprising:
- obtaining an indication of a waveform associated with a network node, the indication indicating whether the waveform is used by the network node in a Uu link associated with the network node, and wherein the indication includes a bitmap that indicates a first bit value or a second bit value for a message in a random access procedure or an initial access, or for a downlink shared channel for a band or a band combination, and wherein the first bit value corresponds to a first waveform type and the second bit value corresponds to a second waveform type; and
- transmitting, to a second UE and via a sidelink interface between the first UE and the second UE, the indication of the waveform associated with the network node.

28. A method of wireless communication performed by an apparatus of a second user equipment (UE), comprising:
- receiving, from a first UE and via a sidelink interface between the second UE and the first UE, an indication of a waveform associated with a network node, wherein the indication indicates whether the waveform is used by the network node in a Uu link associated with the network node, and wherein the indication includes a bitmap that indicates a first bit value or a second bit value for a message in a random access procedure or an initial access, or for a downlink shared channel for a band or a band combination, and wherein the first bit value corresponds to a first waveform type and the second bit value corresponds to a second waveform type; and
- performing, to the network node, a transmission based at least in part on the waveform associated with the network node.

* * * * *